Patented July 23, 1929.

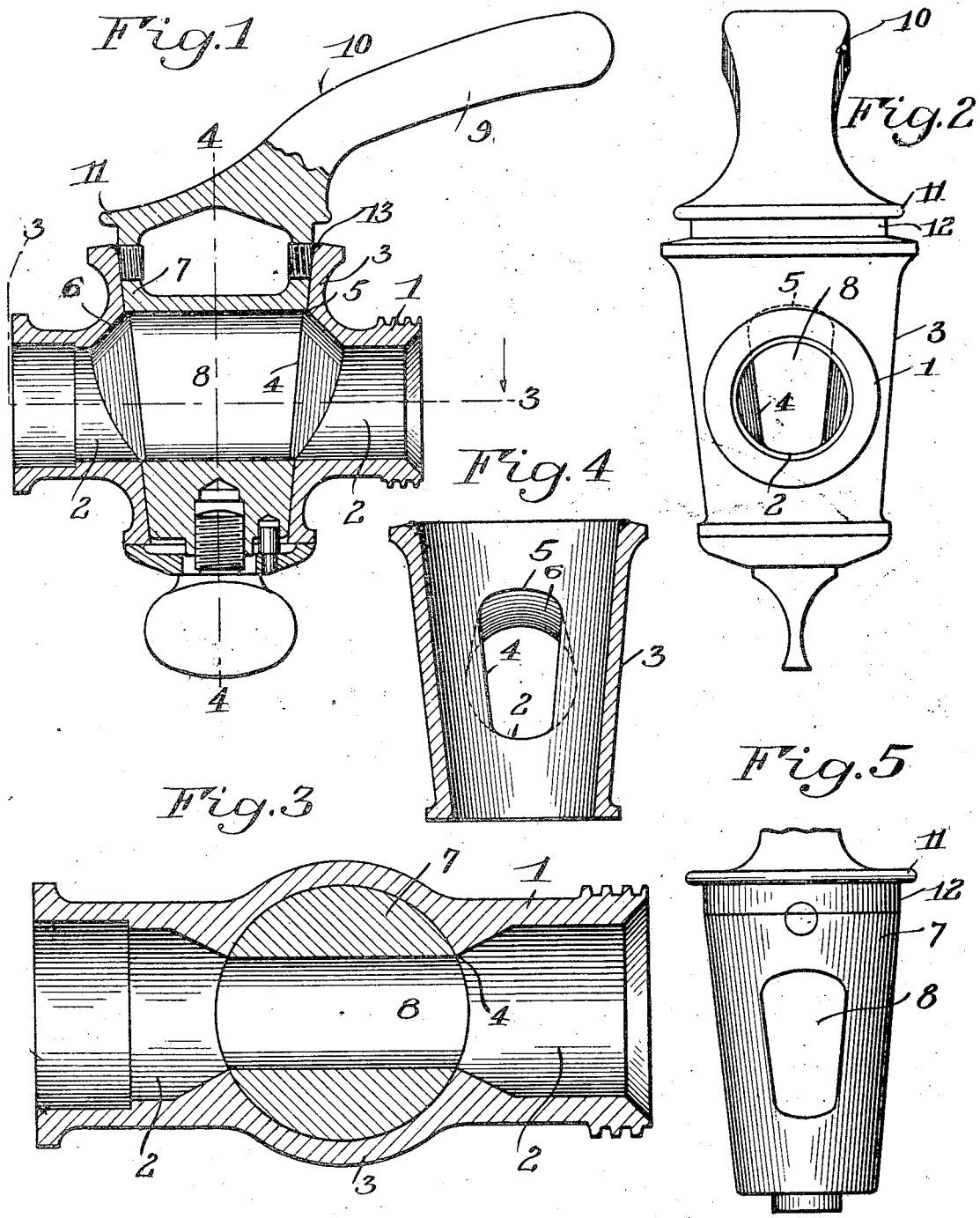

1,721,877

UNITED STATES PATENT OFFICE.

HARVEY FELDMEIER, OF LITTLE FALLS, AND CHARLES F. WRAY, OF ROCHESTER, NEW YORK, ASSIGNORS TO D. H. BURRELL & CO., INC., OF LITTLE FALLS, NEW YORK, A CORPORATION OF NEW YORK.

VALVE STRUCTURE.

Application filed June 8, 1927. Serial No. 197,349.

The invention relates to a valve structure with particular reference to the type that employs a turn plug, and is especially adapted for controlling the flow in milk lines and other like uses.

One object of the invention is to afford an arrangement that permits using a plug of minimum size and weight for controlling a pipe of a given circular cross-section.

A further purpose of the improvement is to construct a valve body in such a way that it shall possess maximum strength and stiffness, so as to effectively resist any downward pressure or strain placed upon it by pressing down on the plug.

Still another object of the invention is to afford a turn plug with a port of non-circular cross-section that will efficiently cooperate with a passage having a circular cross-section and without retarding the flow of liquid therethrough when the valve is open, the lower side of the port in the plug lining up with the bottom of the circular passage so as not to form a pocket.

An additional purpose is to construct a plug valve that can be readily cleaned and the ground surface of which is protected when the plug is removed from the valve body.

To these and other ends, the invention consists in the construction and arrangement of parts that will appear clearly from the following description when read in conjunction with the accompanying drawing, the novel features being pointed out in the claim at the end of the specification.

In the drawings:

Figure 1 is a vertical sectional view of a preferred form of our invention;

Figure 2 is an end elevation thereof;

Figure 3 is a horizontal sectional view on line 3—3 of Figure 1;

Figure 4 is a vertical sectional view on line 4—4 of Figure 1, showing the valve removed, and Figure 5 is a side elevation of the plug valve.

Referring more particularly to the drawing, in which like reference numerals refer to corresponding parts throughout the several views, 1 designates a valve body with outer ends adapted to be connected in the usual manner to pipe sections of a line, and having a longitudinal passage 2 of circular cross-section corresponding to that of the pipe to which the body is joined.

If a plug valve is used with a port having the same circular cross-section as the passage just referred to, it necessitates a comparatively large and heavy valve. It is desirable to reduce the size and weight of the valve to a minimum both for manufacturing purposes as well as handling the same, and to accomplish this we employ a plug somewhat longer and narrower than would otherwise be required, and provided with a correspondingly long and narrow port of the same cross-sectional area as that of the circular passage in the valve body.

To accommodate such a valve the passage in the valve body is shaped to register with the port in the plug. Accordingly, the valve body is extended upwardly, as indicated at 3 to afford increased vertical bearing for the valve, and the passage 2 is provided at its inner ends with openings 4 which are of elliptical-like formation, or long and narrow and preferably tapered from top to bottom. The bottoms of the openings 4 are coincident with the bottom of the passage 2 whereas the tops and sides 5 of openings 4 are located somewhat above and inwardly with respect to the tops and sides of the passage 2 and are connected therewith by inclined faces 6. With this arrangement, the valve body is made of greater vertical extent than the conventional construction, the metal is better distributed, and the valve body is strengthened and stiffened so that it offers greater resistance to any destructive pressure that might be placed on the plug.

The plug or valve that cooperates with the valve body just described is designated generally at 7 and is of tapered formation with a ground exterior surface to fit the correspondingly tapered valve receiving opening in the valve body. 8 designates a port in the plug 7, this port being of the same contour as the openings 4 at the inner ends of the passage 2. The cross-sectional area of the port 8 and of openings 4 is the same as that of the circular passage 2 so as to permit a constant volume of liquid to flow therethrough. By employing a relatively long and narrow port in the plug, the latter can be made of less diameter than if a circular port were used. This permits use of a plug of longer and narrower formation than the conventional type, requiring less material and being of less weight, making it more convenient to remove or insert the plug.

The plug is provided with a handle 9 which extends laterally and slightly upwardly from one side of the top of the plug, as shown in Figures 1 and 2. The handle forms in effect a continuation of the top of the plug, all being merged into one continuously and gradually curved surface 10 that is unbroken and makes it extremely easy to keep the handle in a clean, sanitary condition, while not adding excessive weight to the valve unit.

At its top, the plug is provided with a rim or annular projection 11 extending laterally somewhat beyond a cylindrical surface 12 that is located immediately beneath the rim 11 and between it and the valve body, or the tapered portion of the plug. The cylindrical portion 12 permits the plug to wear or grind itself into the tapered opening in the valve body without making possible the formation of a ridge by contact between the plug and the upper edge of the valve body, as would be the case if the tapered portion extended clear to the top of the plug.

When the plug is removed from the valve body it is frequently laid, and sometimes dropped, into a concrete sink or on some other hard surface which damages the ground surface of the plug and interferes with its efficiency. To overcome this, the projection or rim 11 just referred to is provided so that if the plug is laid down with its ground surface horizontal, the rim 11 contacts with the supporting surface and prevents the ground tapered part of the plug from being damaged thereby. In order to further guard against damaging the ground surface of the plug as it is removed from or replaced in the valve body, the latter is provided at the upper edge of the valve receiving opening with a rounded edge 13, so as to prevent scratching or denting the ground surface of the plug if the latter accidently comes in contact with the edge of the valve body at this point.

While the invention has been described with reference to certain details of construction, it is not confined to the structure herein set forth, and this application is intended to cover any modifications or departures coming within the intended purposes of the improvements or the scope of the following claim.

We claim:

A sanitary valve structure for milk lines and the like comprising in combination a valve body having a round tapering opening therein and a plug valve including a round tapering ground surface engageable with said opening in the valve body, the tapering surface of the plug terminating at its inner end in a cylindrical portion normally located beyond the tapered opening in the valve body and permitting the plug as it wears to grind into the valve body, and a shoulder beyond said cylindrical portion acting to support one end of the plug on a flat surface when removed from the valve body so as to hold said tapered ground surface away from the supporting flat surface and thereby protect said ground tapered portion of the plug, the shoulder being at the base of a handle that is formed integrally with the plug, said handle extending laterally from one edge of the top of the plug, the upper surface of the handle and the top of the plug having substantially straight lines laterally and merging together endwise forming continuous gradual curves from the outer end of the handle to the opposite edge of the plug.

In witness whereof, we have hereunto signed our names.

HARVEY FELDMEIER.
CHARLES F. WRAY.